Patented June 12, 1928.

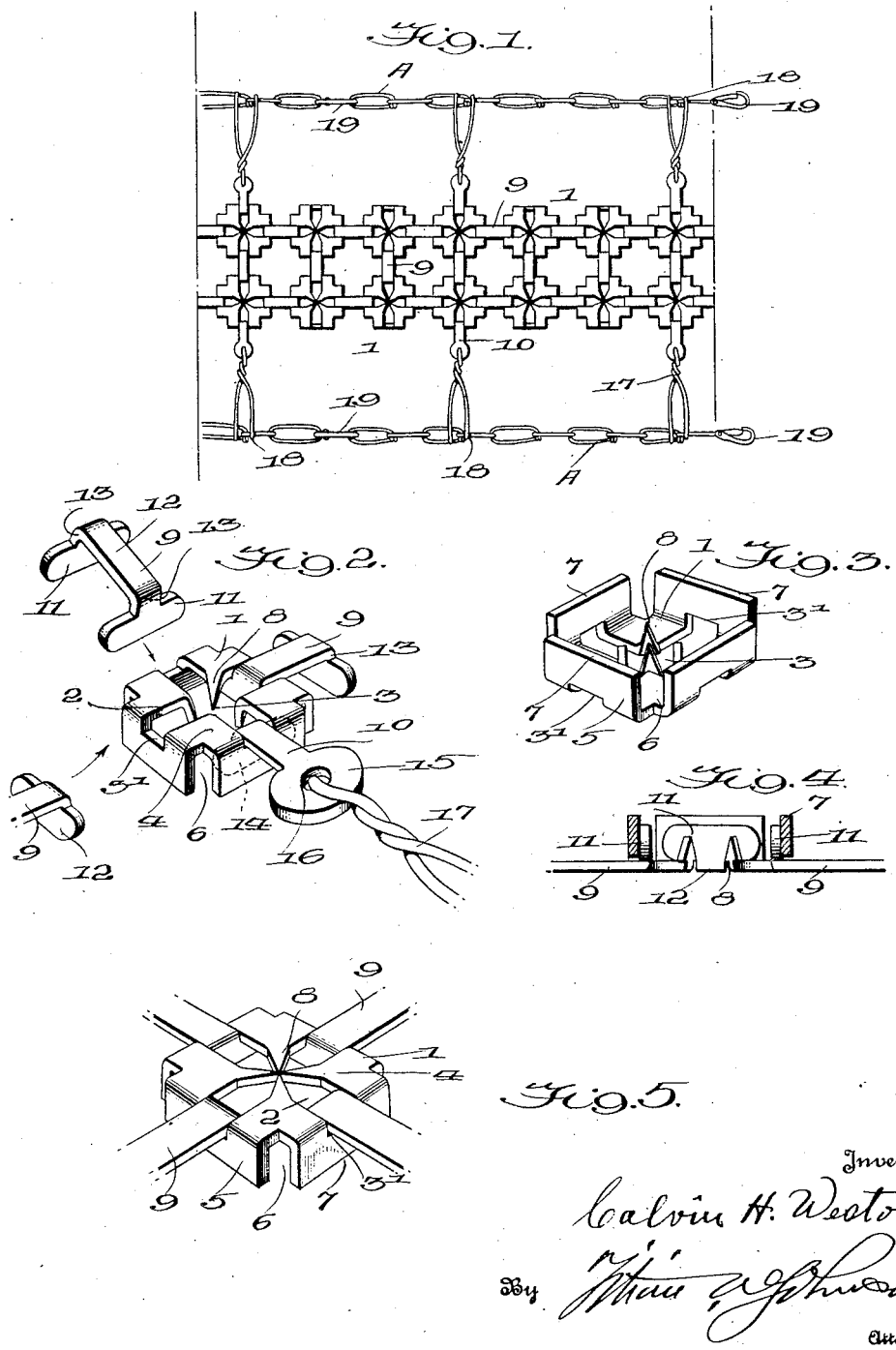

1,673,655

UNITED STATES PATENT OFFICE.

CALVIN H. WESTON, OF TYRONE, PENNSYLVANIA.

NONSKID CHAIN FOR AUTOMOBILES.

Application filed December 16, 1927. Serial No. 240,567.

This invention relates to non-skid chains for pneumatic and other tires.

The invention consists in the main of a chain formed of links of novel design, the parts of which may be readily assembled and disassembled whereby a chain of any desired length and width may be readily and quickly built up, the parts of the links being interchangeable, thus rendering it feasible to repair the chain by replacing any damaged part, the parts being of such character that they may be cheaply made and obtained from the source of manufacture or other place, at a trifling cost.

An object of the invention is to provide a chain having that part which lies against the tire, of such construction as to present a smooth surface to the tread of the tire so as to not injure the same, the opposite side or bottom of the chain being so formed as to present a rough surface to the road, that will render skidding of the machine practically impossible.

A further object is to so construct the road bearing surface or under sides of the links that the movement between the parts constituting the links will automatically and quickly dislodge snow, ice, or other accumulations picked up by the chain.

At the outset I desire it understood that I do not limit myself to the precise arrangement of links shown in the drawing wherein two central rows of links are shown connected with the side or runner chains, for obviously there may be a greater number of rows, and the rows, regardless of their number may be arranged "continuous" throughout the length of the chain, or in rows so separated and arranged that groups of links will be provided, properly separated, so long as there is provided a sufficient gripping surface in proportion to the size and character of the tire for which the particular chain is designed.

The invention contemplates the provision of a chain whose links are, after the parts constituting them have been assembled, closed so that the parts will not be disengaged in use, there being left however at the ends of the series of links, a transverse series which will be open so that the ends of the chain as a whole may be coupled, there being provided suitable means for connecting the ends of the side or runner chains, at the point or near where the open non-skid links are left.

Other objects and advantages of the invention will become apparent in the course of the following description, one of which, in addition to those above mentioned, being a construction whereby the chain may be quickly built up in the first instance, and quickly operated upon for the replacement of parts and one that will be sufficiently flexible to properly fit the tire, and adapt itself to irregularities of the road.

In the drawings illustrating the invention:

Figure 1 is a top plan view of a section of chain constructed in accordance with my invention, there being shown two rows of links centrally located between the side strands of the runner chain.

Figure 2 is a perspective disassembled view of one of the links viewed from the upper or tire tread side of the chain.

Figure 3 is a similar view of the rectangular link member viewed from the under side before the spanner retaining points are bent into final position.

Figure 4 is a central cross section of the member shown in Figure 3.

Figure 5 is a perspective view of the link with the spanner retaining points bent into the plane of the upper surface of the link, for retaining the spanner.

Referring to the drawings:

The numeral 1 designates what I will term the rectangular link member, meaning a member substantially rectangular, which forms the nuclei from which the chain is built up in connection with spanner members which cooperate with the nuclei to form a plurality of flexible links which when connected to each other and to the side strands of the runner chain, produces a non-skid undersurface well adapted for the purposes of this invention. As intimated the members 1 are identical in construction, in the first place, they are interchangeable and entirely alike in all particulars in the final structure, with the exception of the links at the ends of the chain, which links are left open so that the spanner ends of the adjacent links may be inserted to complete the circle around the tire, there being as shown, suitable connecting means for the runner chains, adjacent the open links.

The links being virtually identical, the description of one will serve as a description for the next. The link is provided with radial recesses 2, which recesses intersect each other and are normally open at their inner ends, leaving a central open space 3, at the center of the member, and terminate in a shoulder 3', at their other ends. The member presents a flat upper surface 4, smooth to prevent cutting into the tire tread and it is formed with down turned sides or flanges 5, with cut out corner portions 6, the turned down portions constituting calks 7, which impinge into the road surface. The shoulders 3' are sufficiently below the surface 4, preferably for a depth equal to the thickness of the spanner members, so that the tops of said members when the links are assembled, will be flush with the upper smooth surface of the member 1. The spanners referred to will be later described. At the points where the open end recesses intersect the material of the member 1, is, in the first instance, bent downward and forms spurs 8, which later are bent back to retain the spanner members in all of the links with the exception of those that are located at the ends of the chain.

The numeral 9 designates the longitudinal and transverse spanners or those that connect the members 1, lengthwise and crosswise of the chain, and 10 designates the spanner employed to connect some of the links with the runner or side chains, as is clearly shown in Figure 1. The spanner 9 is constituted by two similar heads 11, connected by a cross bar 12, the ends of the cross bar where they merge into the heads, being curved downward as indicated at 13, so that the heads will take proper position against the insides of the flanges of the member 1, and bring the top of the bar 12 flush with the upper surface of said member, as shown best in Figures 2 and 5. The spanner 10 is provided with but one cross head 14, which when in position in the member 1 acts like the head 11, but in order to make a connection between this spanner 10 and the side or runner chains A, I provide the spanner with a disk 15, having an eye 16, located centrally therein for the reception of the loop of a twisted wire link 17, the prongs of which terminate in eyes 18, by which the wire links and thereby the non-skid links are attached to the runner chains A. These side spanners obviously may be employed in any suitable number and spaced apart as the exigencies of the case may require.

Referring particularly to Figure 5, it will be seen that the spurs 8 have been bent back to a position where their ends converge at the center of the member 1, in which position they are flush with the top of said member. As probably has already been supposed, these spurs are bent up after the spanners have been inserted in the member 1, and that said spurs so bent, prevent the spanner ends from being removed from their places, allowing meanwhile, considerable play of the spanner ends, the play as a matter of fact being commensurate with the length of the recess 2, to the point where the spurs are formed, thus giving flexibility to the chain as a whole.

The numeral 19 designates fastening devices which are adapted for connection with adjacent links of the spanner or side chains A. These may be as numerous as is found necessary to conveniently mount and dismount the same, it being understood of course that the length of the side chains will be considerably greater than the non-skid portion of the chain, or that part which encircles the periphery of the tire.

Assuming the spurs to bent down and it is desired to insert a spanner of either kind described, the head of the spanner is inserted at the center of the member parallel with the inner side edges of either recess and when the head is below the spurs the spanner is turned edgewise and drawn into the contracted inner end of the recess, when it may be readily turned flatwise to bring the spanner head against the flange of member 1. As a section is thus formed other sections are brought in juxtaposition to the first and the spanner heads inserted in the way described, until the proper quantity of chain is built up. The side spanners 10 with the single head are inserted in the same way as the spanners 9, but at the sides of the members 1, in position to take the wire links that connect the non-skid portion of the chain to the side or runner chain A. At a time convenient for the operation, the spurs are bent to substantially the position shown in Figure 5, all except the links at the ends of the chain, which are left open as shown in Figures 2, 3, and 4, so that the spanners 9 and 10, or either of them, may be inserted and removed for coupling and uncoupling the chain to facilitate its application to the tire, or its removal therefrom.

Claims:

1. A non-skid chain including a plurality of links formed of metallic members having flat upper surfaces and provided with radially arranged intersecting recesses normally open at their inner ends, each member being formed with downturned edges forming calks adapted to impinge in a road surface, spanner members having means for engaging the inner sides of the recessed member, whereby said recessed members are linked together.

2. A non-skid chain including a plurality of links formed of metallic members having flat upper surfaces and provided with radially arranged intersecting recesses normally open at their inner ends, each member being formed with downturned edges forming calks adapted to impinge in a road surface, spanner members having cross heads at their opposite ends, adapted to engage the inner surfaces of the downturned edges of the adjacent recessed members, whereby said members are linked together, runner chains, and means for connecting some of the spanners with said runner chains.

3. A non-skid chain including a plurality of links formed of metallic members having flat upper surfaces for engagement with the tread of a tire, said members being provided with radially arranged intersecting recesses and downturned edges forming calks adapted to impinge in a road surface, spanners comprising bars having cross-heads adapted to enter the recesses in the recessed members and engage the inner sides of the downturned edges of the recessed members to couple said members longitudinally, and other spanners having means for engaging the inner sides of the downturned edges of the recessed members, a runner chain on each side of the recessed members and spaced therefrom, and means for connecting the last mentioned spanner members to said runner chains whereby the recessed members are supported between said runner chains.

4. A non-skid chain including a plurality of links formed of metal members having flat upper surfaces, and radially arranged intersecting recesses therein, said members being formed with downturned edges forming calks adapted to impinge in a road surface, spanners having cross heads adapted to enter said recesses and lie against the inner faces of the downturned edges of the recessed members, and means at the intersection of the recesses in the recessed members for retaining the spanners in place in said members.

In testimony whereof he hereunto affixes his signature.

CALVIN H. WESTON.